(12) United States Patent
Legrand et al.

(10) Patent No.: US 6,502,365 B1
(45) Date of Patent: Jan. 7, 2003

(54) ASSEMBLY METHOD AND INSTALLATION, A DEVICE ASSEMBLED THEREBY, AND A UNIT INCLUDING THE DEVICE

(75) Inventors: Denis Legrand, Wargnies (FR); Bernard Savaëte, Rousies (FR); André Singer, Stouffville (CA)

(73) Assignee: PPG Industries Glass SA, Puteaux (FR)

( * ) Notice: Subject to any disclaimer, the term of this patent is extended or adjusted under 35 U.S.C. 154(b) by 0 days.

(21) Appl. No.: 09/536,493

(22) Filed: Mar. 27, 2000

Related U.S. Application Data

(62) Division of application No. 08/928,685, filed on Sep. 12, 1997, now Pat. No. 6,120,631.

(30) Foreign Application Priority Data

Sep. 12, 1996 (FR) .......................................... 96 11141

(51) Int. Cl.⁷ ................................................. E04C 2/54
(52) U.S. Cl. ..................... 52/786.11; 161/196; 40/152
(58) Field of Search ........................ 52/786.11, 786.12

(56) References Cited

U.S. PATENT DOCUMENTS 3,456,374 A * 7/1969 Baermann .................... 40/152
3,457,138 A * 7/1969 Miller ........................ 161/196
4,307,551 A   12/1981 Crandell ....................... 52/235
5,885,714 A   3/1999 Demeester ................... 428/441

FOREIGN PATENT DOCUMENTS

| DE | 3837701 A1 | 5/1990 |
| EP | 0 344 486 A1 | 12/1989 |
| GB | 2 024 297 | 1/1980 |

* cited by examiner

*Primary Examiner*—Yvonne M. Horton
*Assistant Examiner*—Steve Varner
(74) *Attorney, Agent, or Firm*—Nawrocki, Rooney & Sivertson, P.A.

(57) ABSTRACT

The invention relates to assembling together at least two envelope elements with at least one deformable element between the two envelope elements so that the elements are secured together rigidly in irreversible manner, the assembled-together elements being designed to be subjected to compression stresses in a direction that at least intersects an assembly surface; bonding treatment is provided so that at least one compression pad has its first assembly surface in contact with the assembly surface of the first envelope element and so that a second assembly surface of a pad is in contact with an assembly surface of the second envelope element.

21 Claims, 2 Drawing Sheets

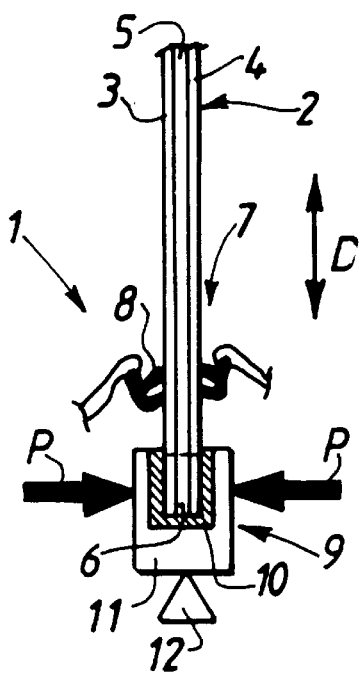
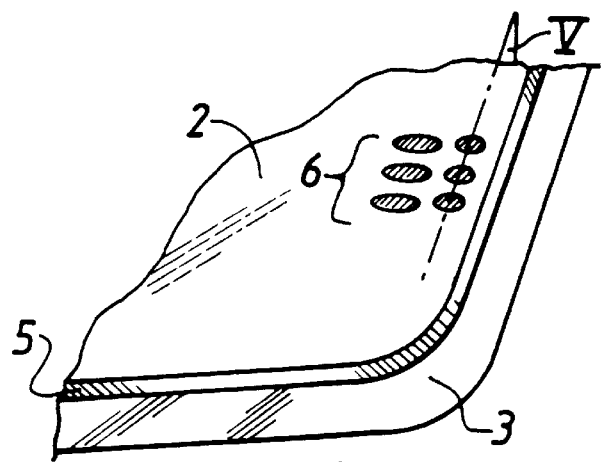
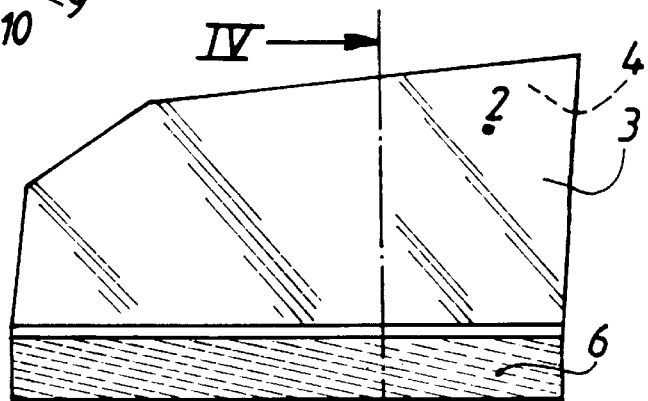
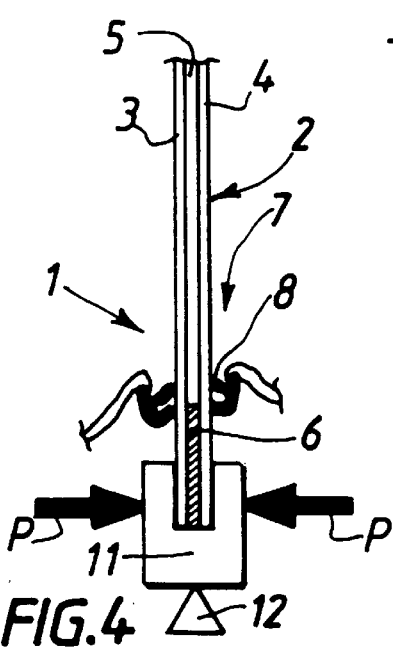
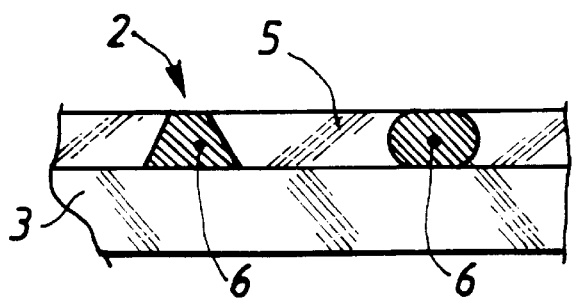

ASSEMBLY METHOD AND INSTALLATION, A DEVICE ASSEMBLED THEREBY, AND A UNIT INCLUDING THE DEVICE

This application is a Division of Ser. No. 08/928,685 filed Sep. 12, 1997 now U.S. Pat. No. 6,120,631.

FIELD OF THE INVENTION

The invention relates to the general technical field of assembling elements together.

In particular, it relates to an assembly method, an assembly installation, a device assembled thereby, and a unit including the device.

The term "assembly" is used herein to mean any operation whereby at least two hard and brittle elements are secured to each other, and also to at least one deformable element disposed between the two hard and brittle elements, rigidly and in irreversible manner.

The term "irreversible" means that separating the elements will spoil them.

BACKGROUND OF THE INVENTION

Such assembly is common in numerous technical fields, regardless of the structure and/or the composition of the materials and/or the final purpose of the elements.

Such assemblies are desirable in numerous technical fields such as building and public works, furniture, and mechanical engineering, in particular.

For greater simplicity, the invention is described in the field of glazing. The scope of the invention is not limited in any way to glazing, which is merely the context in which the invention originated.

Likewise, the term "envelope element" for designating the elements that are hard and brittle is employed herein for the purpose of simplicity. It implies no limitation as to the number and/or disposition of such elements.

A technical problem solved by the invention is described with reference to an example concerning laminated glazing.

The following documents are mentioned in this field.

Document DE-A-38 37 701 describes a window provided with holes into which adhesive is inserted for bonding purposes.

Document GB-A-2 024 297 describes a window with a channel section rail onto which fixing bolts are welded.

Document U.S. Pat. No. 4,307,551 describes glass plates for covering a wall, and including section member rails stuck in the region of the edges.

Document EP-A-344 486 describes a thick glass plate for covering purposes, with sheet metal stuck thereto.

In laminated glazing, the envelope elements are generally made of glass, synthetic material, or the like. The deformable element(s) is/are generally made of thermoplastic synthetic material in the form of laminations.

The elements are said to be "deformable" since they are suitable for being deformed plastically and irreversibly, commonly known as "creep".

A rise in temperature, e.g. under the effect of the sun, increases creep.

In particular, under certain conditions of temperature and/or stress, these elements are deformed because of their low resilience. Thus, they do not return to their original shape once the conditions have gone.

For example, the application of stress on laminated glazing, e.g. in the form of compression for holding the glazing in position, often gives rise to creep.

This causes mechanical damage, and spoils the waterproofing of the glazing and/or the unit in which it is integrated.

The mechanical damage appears as a change in the shape of the glazing (delamination, thickness, etc.).

When that happens, the glazing is no longer properly held or driven. In particular, the connection between the glazing and the holding and/or drive means is degraded (backlash, vibration, jamming, etc.), and may even be broken.

At present, industrial solutions are unsatisfactory, in particular because of cost.

To secure the glazing to its holding and/or drive means, it is common practice to provide it with discontinuities that open out to two opposite faces in the main direction of the stresses. These discontinuities are generally ports, holes, or openings.

This weakness the glazing and increases its cost. Also, the means secured to the glazing are then heavy, whereas, on the contrary, industry is looking for ways of reducing weight.

The same drawback of weight is to be found with means secured by clamping the glazing by means of a yoke.

A channel section insert, e.g. made of rubber or the like, generally engages the edge of the glazing and is rigidly connected to the yoke. The size, the reliability, and the simplicity of the unit including the glazing all suffer therefrom.

These drawbacks present further difficulties when faced with increasing requirements of the industry concerning soundproofing, reduction in weight and size, and concerning safety and reliability (ability of the assembly to withstand shock and conditions of heat or humidity, etc.).

It is also appropriate to restrict or even eliminate manufacturing rejects due to delamination, defects, or breakage, e.g. due to final assembly in an autoclave (often at 1.2 MPa and at 145° C. for more than 1 hour).

Delamination can also occur during assembly or during the aging cycle, and can escape attention during assembly, which is one of the causes of such elamination.

The above problems are described in the context of aminated glazing, but they also occur in numerous other mechanical fields.

There is a common need to apply compression stresses from the outside on a device having an envelope which is hard and brittle and a core which is flexible. A term sometimes used is "low resilience".

This applies to a panel or part provided with hard outer layers (cellulose material, synthetic material, metal, or porcelain or plaster) against which stressed need to be applied, and an internal part that is deformable, such as insulating foam, a sealing film, a biological barrier, or the like.

Such panels or parts are often to be found in furniture, public works, building, mechanical engineering, etc.

OBJECT AND BRIEF SUMMARY OF THE INVENTION

There therefore exists considerable demand to solve the problems and drawbacks mentioned.

To this end, the invention provides a method of assembling at least two envelope elements and at least one deformable element between the two envelope elements to secure these elements together rigidly in irreversible manner, the assembled-together elements being designed to be subjected to compression stresses in a direction that intersects, or is even substantially perpendicular to, at least one assembly surface.

This method comprises the following combination of steps:

placing at least a first envelope element in an assembly position with at least a first assembly surface accessible;

placing at least a deformable element with a first assembly surface facing the first assembly surface and with an intermediate second assembly surface that is accessible, said deformable element being provided with at least one compression pad and/or with at least one void formed therein;

optionally placing at least one separate compression pad in said void, facing the assembly surface of the first envelope element;

placing at least a second envelope element with at least one assembly surface facing at least an assembly surface of a deformable element and/or at least one compression pad; and performing bonding treatment such that at least one compression pad has its first assembly surface in contact with the assembly surface of the first envelope element, and that a second assembly surface of a compression pad is in contact with the assembly surface of the second envelope element.

This provides a continuous bridge with one or more adjacent pads between the envelope elements, with the bridge being strong in compression and capable of absorbing stress without harming the assembly.

In a particular implementation, the bonding treatment step includes a mechanical transformation operation such as deformation, e.g. by pressing at least one pad and/or a physical transformation such as depressurizing or putting under a vacuum.

In an implementation, the bonding treatment step includes a chemical transformation operation such as polymerization, solidification, and/or drying.

In an implementation, the method provides for the bonding treatment step to include a heating operation e.g. in a bag oven and/or a stove.

According to a characteristic, the method includes a plurality of steps consisting in:

placing at least one deformable element with a first assembly surface facing a first or a second assembly surface; and optionally placing in a void formed therein at least one separate compression pad.

The invention also provides an installation for assembling together at least two envelope elements with at least one deformable element between the two envelope elements to secure the elements together rigidly in irreversible manner using the above-specified method.

An embodiment provides means selected from: a clean room and/or a conveyor system and/or a heater system, such as a bag oven, and/or a wheel pressing system.

The installation is provided with programmable means such as a detector or a controller, for monitoring the extent to which steps or operations have been accomplished and/or suitable for performing such steps or operations automatically, at least in part.

The invention also provides a device that is designed to be subjected to compression stress, and including at least two envelope elements and at least one deformable element between the two envelope elements, in which the elements are secured together rigidly in irreversible manner.

By way of example, the elements may be assembled together using the above-mentioned method and/or by means of an installation as described above.

In the device, at least one compression pad disposed between the envelope elements is made of a material whose hardness is substantially less than that of the envelope elements with which it is in contact and greater than that of the deformable element, at least at the bonding treatment temperature. The Vickers or Brinell number of the pad is about 600 to 800, for example.

In an embodiment, at least one compression pad comprises a material selected from: synthetic material such as aramid and/or polyvinyl butyral, and/or glass, and/or a metal such as lead and/or tin, said material being optionally a fiber material and, for example, is bonded to the deformable element by stitching.

According to a characteristic, at least one compression pad and/or one deformable element comprises a portion that is opaque and/or translucent and/or tinted.

An example of the device provides for at least a compression pad and/or a deformable element to be of a size in the intended compression stress direction that is substantially equal to the distance between the assembly surfaces facing it, prior to the bonding treatment step, said size being equal to the distance in the final device.

According to a characteristic, at least a compression pad and/or a deformable element and/or an envelope element is substantially in the form of a lamination, e.g. plane, bulging, or complex.

It is desirable to give the pad a shape that avoids "wounding" the envelope element during assembly.

In an embodiment, at least a compression pad and/or an envelope element, or the device does not have any discontinuity opening out to the two opposite assembly surfaces in the direction of the expected stresses, e.g. a port, hole, or opening.

A characteristic provides for at least one envelope element to comprise a transparent material such as glass or a synthetic material such as polyethylene or the like, the device constituting, for example, laminated glazing.

Another characteristic provides for at least one compression pad to be located in a compression zone and/or to define a pattern, in the assembly plane and/or in cross-section, the pattern being constituted by a polyhedron, lines, or circles.

By way of example, an embodiment of the device comprises, between two elements, at least one fluid and/or film adhesive that is optionally thermosetting.

The invention also provides a unit including a device as mentioned above.

The unit comprises holding and/or drive means, e.g. that operate by clamping, which co-operate with the device in register with at least one compression pad, said means contributing to securing the device to the unit, and optionally to driving the device between two positions.

In an embodiment, the unit includes a passage, optionally provided with sealing means, with all of the compression pads of the device being located on one side only of the passage regardless of the position of the device, the unit constituting, for example, a vehicle bodywork component such as a door, and the device constituting laminated glazing.

BRIEF DESCRIPTION OF THE DRAWINGS

The invention is described in the following detailed description of embodiments given with reference to the accompanying drawings, in which:

FIG. 1 is a fragmentary cross-section view in elevation through a vehicle bodywork component forming a unit of the invention, provided with a laminated window forming a device of the invention, and with holding and drive means including an insert;

FIG. 2 is a fragmentary perspective view of a laminated window forming a device of the invention and including a single envelope element, a deformable element bonded to the single element, and compression pads integrated in the deformable element while it is being assembled with the envelope element; such assembled elements are sometimes referred to as "bi-layer" elements;

FIG. 3 is a face view in elevation of a window having a compression pad in the form of a bottom strip extending longitudinally from edge to edge over a limited height, and optionally provided with adhesive;

FIG. 4 is a view similar to FIG. 1, in section on line IV—IV of FIG. 3;

FIG. 5 is a fragmentary cross-section on plane V of FIG. 2, with a compression pad shaped to assist in penetration and locking;

MORE DETAILED DESCRIPTION

Figure 6:
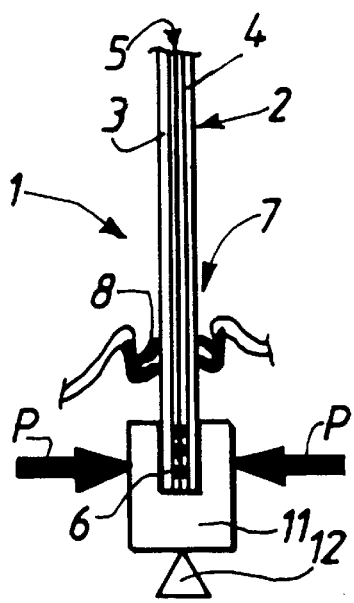
FIG. 6 is a view similar to FIG. 1 of a device in which the pads extend between two laminations forming the deformable element, said element being delivered with the pads integrated therein and comprising two laminations.
Figure 7:
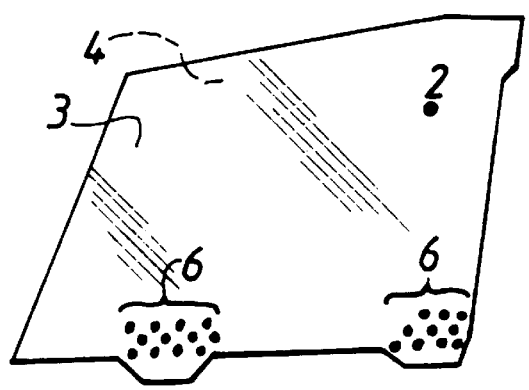
FIG. 7 is a view similar to FIG. 2 showing a device in which the pads are discontinuous in shape, being circles or points, for example, and integrated in the deformable element by sewing or analogous means.

For the examples of the description, a unit 1 is shown in FIGS. 1, 4, 6, and 12.

In this case, the unit 1 is a vehicle bodywork component, and in particular a door.

The door-forming unit 1 includes a device 2 forming a laminated window.

In the figures, there can be seen a first envelope element 3, a second envelope element 4, and a deformable element 5.

The elements 3, 4, and 5 form parts of the device 2, and thus of the assembly 1.

Compression pads are shown at 6 in the figures. These pads also form parts of the device 2 and thus of the assembly 1.

The door of the assembly 1 includes a passage 7 across which the device 2 extends.

Reference is made to a reference midplane in which the device 2 generally extends. The midplane coincides with the plane of the laminations in FIGS. 3, 7, 9, and 11.

In FIGS. 1, 4, 6, and 12, the midplane extends generally in a direction perpendicular to the plane of the laminations and from top to bottom thereof.

Reference is also made to a longitudinal plane. The longitudinal plane is a reference plane extending perpendicularly to the midplane and parallel to a "longitudinally" direction which is perpendicular to the plane of the laminations in FIGS. 1, 4, 6, 8, 10, and 12.

Figure 9:
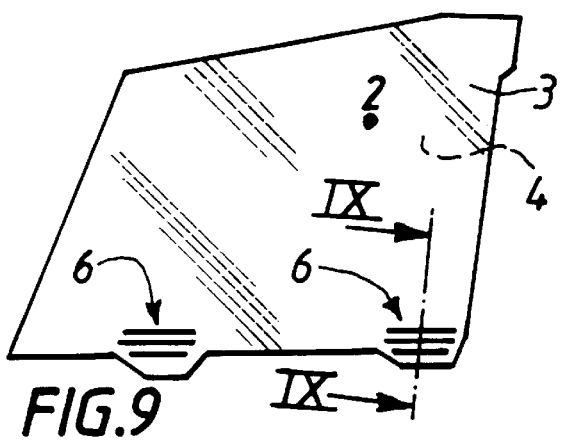
FIG. 9 is a view similar to FIG. 7, with pads in a pattern made up of lines.
Figure 11:
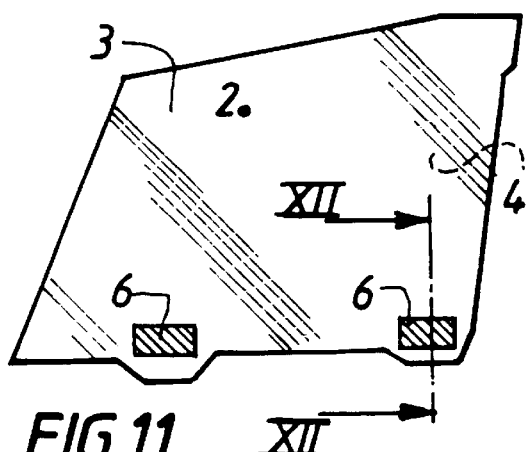
FIG. 11 is a view similar to FIG. 9, with rectangular pads.

In FIGS. 3, 9, and 11, the longitudinal plane coincides with the plane of the laminations and extends perpendicularly to straight lines VI, IX, and XII, respectively.

Reference is also made to a reference "transverse" plane. This is the section plane of FIGS. 1, 4, 6, 8, 10, and 12.

The transverse plane extends perpendicularly to the longitudinal plane and to the reference mid-plane. These three planes, i.e. the longitudinal plane, the midplane, and the transverse plane, are mutually perpendicular.

Returning to the door-forming unit 1, it is observed that the passage 7 extends substantially in the longitudinal plane.

The passage 7 includes sealing means 8, in this case rubber lip gaskets, generally extending in the longitudinal plane.

Each of the two gaskets of the sealing means 8 is in contact firstly with a support-forming bodywork component and secondly with a respective envelope element 3 or 4.

In the figures, numerical reference 9 designates holding means. The holding means 9 comprise a channel section block or insert 10 of flexible material such as rubber. The flanges of the channel section lie against the sides of the device.

The block 10 is itself disposed on a support 11.

The holding means 9 thus act as means for driving the support 2 relative to the remainder of the assembly 1 on which it is mounted, or relative to the holding means 8.

Drive is obtained in direction D of FIG. 1, parallel to the transverse and midplanes.

The device 2 is clamped by the means 9 which applies compression forces P.

Drive means 12, which may be mechanical or manual, for example, serve to drive displacement in direction D.

When the device is a window, displacement in direction D is designed to take place between two positions, a fully raised position and a fully lowered position.

Relative to the passage 7 and to the sealing means 8, all of the compression pads 6 of the device 2 extend on one side only. In other words, the pads 6 are situated on a single side of the sealing means 8 relative to a plane parallel to the longitudinal plane and extending level with the passage 7.

It may be observed that this disposition applies regardless of the position of the device 2, thus making the compression pads 6 invisible in the event of the passage 7 opening to the outside.

Before describing the device 2, general consideration is given to the manufacture of laminated glazing.

As mentioned above, laminated glazing mainly comprises at least two envelope elements 3 and 4 together with at least one deformable element 5 between the envelope elements.

In practice, envelope element 3 is designed to face towards the inside when the device 2 is in use, while envelope element 4 is designed to face towards the outside.

To make the device 2, the envelope elements 3 and 4 are made from "raw" panes of glass.

Various pairs of glass thicknesses are used, e.g. 2 mm and 2 mm; 3 mm and 2 mm; or 6 mm and 3 mm respectively for the outside envelope element 4 and for the inside envelope element 3.

The raw panes are subjected to cutting and shaping operations referred to as initial operations for greater simplicity.

These operations are performed by placing the raw panes for the outside and inside envelopes 4 and 3 one on the other so as to obtain panes that are cut and shaped substantially identically.

A silkscreen printing operation is then performed in which a lead-free enamel is applied to one of the raw pane faces that is to face the other.

The printing may comprise the trademark of the manufacturer, an identification bar code, an antenna, or the like.

Generally, an operation is then performed of powdering using calcium carbonate having a grain size of a few microns. The powdering is generally performed on the raw pane face opposite and facing the face on which the printing operation has been performed.

In certain embodiments, calcium carbonate is replaced by a diatom earth.

There then follows a pairing operation which consists in centering the two raw panes in alternation.

Thereafter there generally follows a heating operation, e.g. in an oven.

In installations, heating is performed continuously at temperatures lying in the range about 650° C. to about 750° C., depending on the shape, the thickness, and the characteristics required of the glazing.

Cooling then takes place. This operation requires mastery of edge tensions and of proper results concerning glass photoelastisymmetry.

There follow operations of washing, drying, and final cooling, so that the temperature of the raw panes is perceptibly less than or equal to the temperature of the deformable elements 5.

There then follows the assembly method which is described below.

In general, it should be observed that an installation I (FIG. 10) for assembling at least two envelope elements 3 and 4 with at least one deformable element 5 between the two envelope elements 3 and 4 seeks to secure these elements 3, 4, and 5 together rigidly in irreversible manner.

In most cases, such an installation is provided with programmable means such as detectors or controllers.

Also, such installations I are usually fitted with means for monitoring the extent to which steps of the operation have been accomplished.

Means are also provided in most installations I that are suitable for performing steps or operations automatically, at least in part.

Depending on the installation I, such an installation includes means selected from: a clean room and/or a heating system, e.g. a bag oven, and/or a wheel presser system.

The assembly method serves to secure the elements 3, 4, and 5 together rigidly in irreversible manner.

This method is for use with assembled elements 3, 4, and 5 that are designed to be subjected to compression stresses P. In this case, the direction of the compression stresses P is substantially perpendicular to the reference midplane.

In any event, the compression stresses P intersect said plane.

It will also be understood that because of the structure of the device 2, the assembly surfaces between the envelope elements 3 and 4 and the deformable element 5 are parallel, at least in certain locations, to the reference midplane. As a result, the respective orientations of the compression stresses P relative to said plane also apply to the assembly surfaces.

The method provides the following steps:
at least a first envelope element 3 is placed in an assembly position with at least a first assembly surface being accessible;

at least one deformable element 5 is placed with at least one assembly surface facing the first assembly surface, and with an intermediate, second assembly surface that is accessible, said deformable element 5 being provided with at least one compression pad and/or one void formed therein;

optionally at least one compression pad 6 is placed in the void facing the assembly surface of the first envelope element 3;

at least one second envelope element 4 is placed with at least one assembly surface facing at least one assembly surface of a deformable element (in this case element 3) and/or at least one compression pad 6; and bonding treatment is performed so that at least one compression pad 6 has its first assembly surface in contact with the assembly surface of the first envelope element 3, and a second assembly surface of a compression pad 6 is in contact with the assembly surface of the second envelope element 4.

It is common practice for assembly to be performed in a clean room, on a conveyor system for carrying the elements 3 and 4 coming from the above-mentioned cleaning operation.

The outside element 3 is placed on the deformable element 5, and then said deformable element 5 is covered by the inside element 4.

By means of the conveyor system, the three elements placed one on another in the manner described are brought to the portion of the installation I that performs the bonding treatment.

Depending on circumstances, it may be a bag oven or a wheel system.

The deformable elements 5 are often cut to the shape of a rectangle or of a trapezium, e.g. 24 hours before assembly.

Provision is also made to press the stack or "sandwich" formed by the two envelope elements 3 and 4 with the deformable element 5 located between them at two points, with this taking place during transfer to the bonding treatment.

When bonding treatment is performed in a bag oven, two objectives are concerned. The first is to degas and the second is to weld the edges together. For this purpose, it is common practice to use a vacuum corresponding to 750 mm of mercury column. Such an oven can be referred to as a vacuum bag oven.

For sealing purposes, the temperature in the bag oven generally lies in the range 90° C. to 100° C.

A base such as a block or an insert is commonly installed. For this purpose, polyvinyl butyral (PVB) is generally used.

In some implementations, polyurethane (PU) has also shown certain qualities.

Similarly, and more generally, provision is made to use appropriate plastics materials.

The bases or "inserts" are, in some cases, pre-coated in adhesive, e.g. by induction heating/sticking.

In some embodiments, provision is also made for spacers to be put into place for a subsequent operation of passing through an autoclave. Such a passage through an autoclave is intended to make all of the surfaces uniform and to make the deformable element 5 transparent and optically free from deformation.

For this purpose, it is necessary for the PVB in this case to be softened and compressed uniformly.

The two envelope elements 3 and 4 are generally used at a pressure of about 1.2 MPa. This is done for a period of 1 hour at a temperature of about 145° C.

Thereafter, optical inspection is performed, e.g. by meare of a sodium lamp at a grazing incidence, and pieces of the deformable element 5 projecting beyond the envelope elements 3 and 4 are trimmed off.

Appearance is then generally inspected.

As described above, the assembly method provides for a bonding treatment step which, depending on circumstances, is accompanied by a chemical transformation operation such as polymerization, solidification, and/or drying.

In certain implementations, the bonding treatment step also includes a heating operation, e.g. in a bag oven, an autoclave, or a stove.

The method can also be used to make up assemblies that comprise in succession a plurality of deformable elements 5 and envelope elements 3 or 4. similarly, it is possible in an assembly to juxtapose, contact surface against contact surface, either a plurality of envelope elements, or else a plurality of deformable elements 5.

An embodiment of this type provides for a plurality of steps consisting in:

placing at least one deformable element 5 with a first assembly surface facing a first or a second assembly surface; and optionally placing at least one separate compression pad 6 in a void formed therein. Conversely, and as shown in FIGS. 2 and 5, it is also possible to provide for a "bi-layer" type of assembly.

Such an assembly comprises a single envelope element 3 which is assembled to one or more deformable elements 5.

At least one compression pad 6 is provided, placed between the envelope elements 3 and 4, or between an envelope element and other elements to apply compression, with the pad being made of a material whose hardness is considerably less than that of the envelope elements 3 and 4 with which it comes into contact.

This hardness is also greater than that of the deformable element 5, at least at the bonding treatment temperature.

For example, the Vickers or Brinell hardness of the pad 6 can be then be of the order of 600 to 800.

The compression pad 6 is generally made of a material selected from: thermoplastic synthetic material such as aramid and/or polyvinyl butyral, and/or glass, and/or metal such as lead and/or tin.

Depending on the application, the same selection applies to the deformable element(s) 5.

In some embodiments, the compression pads are made of fiber material.

By way of example, the pad material can be bonded to the deformable element 5 by stitching such a fiber.

In the example of FIG. 3, the compression pad 6 is entirely opaque while the deformable element 5 is translucent and tinted.

Figure 8:
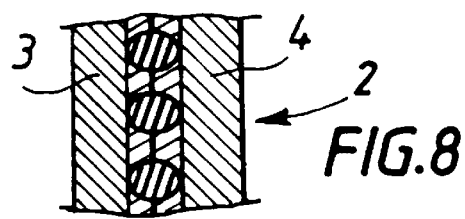
FIG. 8 is an enlarged view of a detail of FIG. 6.
Figure 10:
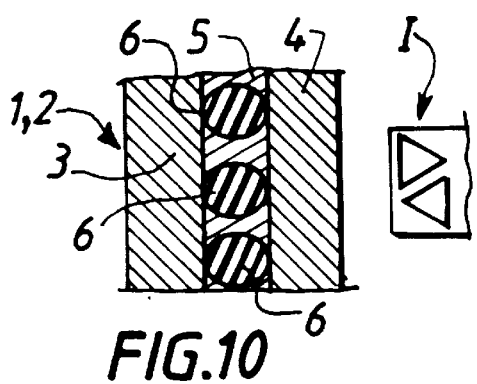
FIG. 10 is a view similar to FIG. 8, showing a detail of FIG. 9 on line IX—IX and also showing a portion of the assembly installation.
Figure 12:
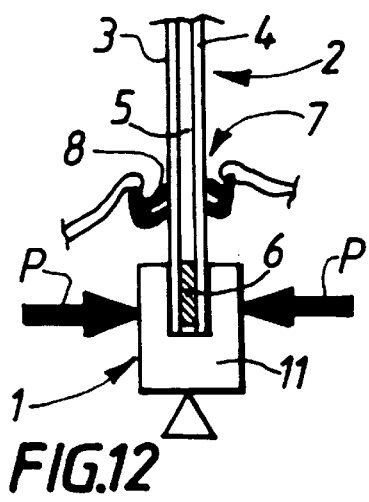
FIG. 12 is a view similar to FIG. 4, on line XII—XII of FIG. 11.

With reference to FIGS. 8 and 10, it can be seen that at least one compression pad 6, and similarly the deformable element 5, is of a size in the final stress direction that is substantially equal to the distance between the assembly surfaces that it faces.

In some cases, this size is slightly greater before the bonding treatment step. As in the figures, this size is substantially equal to the distance in the final device 2.

To make the laminated glass device 2, the deformable element 5 and/or the pad 6 is in the form of a lamination.

By way of example, a lamination can be provided having a thickness of about 0.76 mm. Two component laminations are then provided, each having a thickness of 0.38 mm, with the pads 6 being initially placed between them, as shown in FIGS. 6 and 8.

The pads 6 are either added during assembly or else they form an integral portion of an intermediate product essentially constituted by the deformable element 5 together with the pads 6.

It can thus be seen how the invention makes it possible to provide for the device 2 to have no discontinuities opening out in the two opposite assembly surfaces in the direction of the compression stresses.

The cost of manufacturing a device 2 without any hole or opening is considerably reduced. It is also possible to solve technical problems associated with compressing a device 2 while retaining or improving its mechanical qualities.

For the envelope element(e) 3, 4, when the device constitutes a window, the material used is transparent, such as a glass or a synthetic material of the polyethylene type or the like.

With reference to FIG. 3, it can be seen that the glazing forming the device 2 is provided with a single pad 6 in the form of a strip extending from one edge to the other and also over a fraction of the height.

In FIGS. 2, 5, 7, 8, and 10, the pads 6 are constituted by a plurality of beads forming a pattern in the locations that are to co-operate with the holding means 9.

In FIG. 9, the compression pads 6 are in the form of a plurality of lines forming a pattern.

In the reference midplane, or in a transverse or longitudinal plane perpendicular thereto, the patterns may be polyhedrons, lines, or circles.

It should be observed at this point that an adhesive fluid and/or film, which may optionally be thermosetting, can be provided between any two elements 3, 4, 5, or 6.

As shown in FIG. 11, where the pads 6 are rectangular in shape, it will be understood that the shape of the pads or "filling" must be compatible with the lamination constituting the deformable element 5 creeping in controlled manner around said pads during assembly.

The shape of the pads 6 is determined specifically for this purpose, and also depends on the shape of the holding means 9 which operate as a clamp when cooperating with the device 2.

By obtaining a compression pad 6 that is discontinuous from one edge to the opposite edge of the lamination of the deformable element 5, it is possible to avoid the deformable element being split up into several parts during assembly.

The same applies during use of the device 2.

It is also desirable during assembly to avoid displacement of one compression pad 6 relative to another pad 6.

This constitutes an advantage of embodiments in which each pad 6 is surrounded, at least in part, by the deformable element 5 in the finished device 2.

It should also be observed that the shape of the pad 6 can be selected to facilitate penetration thereof into the deformable element during assembly.

This applies to the pad 6 in the shape of a truncated pyramid shown on the left of FIG. 5.

The same also applies to the "bead" shape shown on the right, and that also has the advantage of "locking" the pad 6 within the deformable element 5.

It will thus be understood that the invention makes it possible to manufacture devices that do not have discontinuities such as holes or openings or other shapes, which discontinuities are usually intended, when they open out in both assembly surfaces, for receiving a mechanism that withstands compression and enables the device to be driven.

The invention also makes it easier to achieve acoustic and/or thermal insulation.

The invention is applicable in fields other than that of the embodiments described, for example in building, public works, furniture, and in mechanical engineering, in particular.

What is claimed is:

1. A device that is designed to be subjected to compression stresses, and including at least two envelope elements and at least one deformable element between the two envelope elements, the elements being secured together rigidly gin irreversible manner by bonding, wherein at least one compression pad disposed between envelope elements is made of a material whose hardness is substantially less than that of the envelope elements with which it is in contact and greater than that of the deformable element, at least at the bonding treatment temperature, the Vickers or Brinell number of the pad being between 600 and 800.

2. A device according to claim 1, wherein at least one compression pad comprises materials selected from the following list: aramid, polyvinyl butyral, glass, lead and tin, said material being a fibrous material which is bonded to the deformable element by stitching.

3. A device according to claim 1, wherein a least one of the compression pad and one deformable element comprises a portion that has a characteristic frog the group including opaque, translucent and tinted.

4. A device according to claim 1, wherein at least one of the compression pad and the deformable element is of a size in the intended compression stress direction that is substantially equal to the distance between the assembly surfaces facing it, prior to the bonding treatment step, said size being equal to the distance in the final device.

5. A device according to claim 1, wherein at least one of the compression pad, the deformable element, and an envelope element is substantially in the form of a lamination which can include one of a plane, bulging, and a complex.

6. A device according to claim 1, wherein at least one of the compression pad, at least one envelope element, and the device has no discontinuity opening out to two opposites assembly surfaces in a direction of expected stresses, including a tort, a hole and an opening.

7. A device according to claim 1, wherein at least one envelope element comprises a transparent material which includes a material selected from glass and a synthetic material including polyethylene, the device itself comprising laminated glazing.

8. A device according to claim 1, wherein at least the compression pad is located in a compression zone and defines a pattern, in the assembly plane and in cross-section, the pattern being constituted by a member of the group including a polyhedron, lines, and circles.

9. A device according to claim 1, comprising one of a fluid and a film adhesive, both of which are a thermosetting adhesive.

10. A unit including a device according to claim 1, and further comprising clamping holding means, for securing the device, and drive means for driving the device between two positions, both said means facing at least one compression pad.

11. A unit according to claim 10, including a passage optionally provided with sealing means with all of the compression pads of the device extending along one side of the passage only, regardless of the position of the device, the unit constituting, a vehicle bodywork component, and the device constituting laminated glazing.

12. A device that is designed to be subjected to compression stresses, and including at least two envelope elements and at least one deformable element between the two envelope elements, the elements being secured together rigidly in irreversible manner by bonding, wherein at least one compression pad disposed between the envelope elements is made of a material whose hardness is substantially less than that of the envelope elements with which it is in contact and greater than that of the deformable element, at least at the bonding treatment temperature, the Vickers or Brinell number of the pad being between 600 to 800.

13. A device according to claim 12, wherein the at least one compression pad is of a material selected from the group including synthetic material including aramid and polyvinyl butyral, glass, and a metal including lead and tin, said material being a fibrous material which is bonded to the deformable element by stitching.

14. A device according to claim 12, wherein at least one of the compression pad and deformable element comprises a portion that has a characteristic from the group consisting of opaque, translucent, and tinted.

15. A device according to claim 12, wherein at least one of the compression pad and deformable element is of a size in an intended compression stress direction that is substantially equal to the distance between the assembly surface facing it, prior to the bonding treatment step, said size being equal to the distance in the final device.

16. A device according to claim 12, wherein at least one of the compression pad and the deformable element and an envelope element is substantially in the form of a lamination, in a member of the group including a plane, a building, and a complex.

17. A device according to claim 12, wherein at least one of the compression pad, an envelope element, and the device has no discontinuity opening out to the two opposite assembly surfaces in the direction of the expected stresses, including a port, a hole, and an opening.

18. A device according to claim 12, wherein at least the compression pad is located in a compression zone and defines a pattern, in the assembly plane and in cross-section, the pattern being constituted by a member of the group consisting of a polyhedron, lines, and circles.

19. A device according to claim 12, comprising between two elements one fluid and a film adhesive which is a thermosetting adhesive.

20. A unit including a device according to claim 12, and further comprising holding and clamping drive means, which cooperate with the device, and facing at least one compression pad, said means contributing to securing the device to the unit and optionally to drive it between two positions.

21. A unit according to claim 20, including a passage provided with sealing means with all of the compression pads of the device extending along one side of the passage only, regardless of the position of the device, the unit constituting a vehicle door, and the device constituting laminated grazing.

* * * * *

UNITED STATES PATENT AND TRADEMARK OFFICE
CERTIFICATE OF CORRECTION

PATENT NO. : 6,502,365 B1
DATED : January 7, 2003
INVENTOR(S) : Denis Legrand et al.

It is certified that error appears in the above-identified patent and that said Letters Patent is hereby corrected as shown below:

Column 11,
Line 6, delete "gin" and insert therefor -- in --.
Line 36, delete "tort" and insert therefor -- port --.

Signed and Sealed this

Sixth Day of September, 2005

JON W. DUDAS
*Director of the United States Patent and Trademark Office*